US012405697B2

(12) United States Patent
Matsumoto

(10) Patent No.: US 12,405,697 B2
(45) Date of Patent: Sep. 2, 2025

(54) POSITION DETECTION SENSOR INCLUDING EXTENDABLE ELECTRODES IN A BENDABLE REGION AND METHOD FOR MANUFACTURING SUCH POSITION DETECTION SENSOR

(71) Applicant: Wacom Co., Ltd., Saitama (JP)

(72) Inventor: Yoshiharu Matsumoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/623,406

(22) Filed: Apr. 1, 2024

(65) Prior Publication Data

US 2024/0248572 A1    Jul. 25, 2024

Related U.S. Application Data

(63) Continuation of application No. 17/890,851, filed on Aug. 18, 2022, now Pat. No. 11,977,710, which is a
(Continued)

(30) Foreign Application Priority Data

Mar. 11, 2020 (JP) ................................ 2020-041493

(51) Int. Cl.
*G06F 3/046* (2006.01)
(52) U.S. Cl.
CPC .... *G06F 3/046* (2013.01); *G06F 2203/04102* (2013.01); *G06F 2203/04103* (2013.01)
(58) Field of Classification Search
CPC ........... G06F 3/046; G06F 2203/04102; G06F 2203/04103
See application file for complete search history.

(56) References Cited

U.S. PATENT DOCUMENTS

2013/0234730 A1    9/2013  Kobori et al.
2015/0382446 A1*  12/2015  Kwon .................. G06F 1/1643
                                                 174/251
(Continued)

FOREIGN PATENT DOCUMENTS

JP    H07-253840 A    10/1995
JP    2013-186784 A     9/2013
(Continued)

OTHER PUBLICATIONS

International Search Report, mailed Apr. 27, 2021, for International Application No. PCT/JP2021/005392, 4 pages.

*Primary Examiner* — Lisa S Landis
(74) *Attorney, Agent, or Firm* — Seed Intellectual Property Law Group LLP

(57) ABSTRACT

A position detection sensor includes a base made of a flexible material. The base includes a terminal section having a plurality of terminal conductors disposed on a first surface of the base. The base includes a sensor pattern section including a plurality of electrode conductors arranged in predetermined patterns in an area that does not overlap with the terminal section on the first surface of the base. End portions of the plurality of electrode conductors are positioned so as to be connectable to corresponding ones of the terminal conductors in the terminal section. The first surface of the base includes a region of the terminal section, a region of the sensor pattern section, and a bendable region between these two regions. Each of the plurality of electrode conductors, which is electrically connected to each of the plurality of terminal conductors, is disposed so as to be extensible in the bendable region.

18 Claims, 10 Drawing Sheets

Related U.S. Application Data continuation of application No. PCT/JP2021/005392, filed on Feb. 15, 2021.

(56) References Cited

U.S. PATENT DOCUMENTS

| | | | |
|---|---|---|---|
| 2018/0059828 A1* | 3/2018 | Matsumoto | H05K 3/10 |
| 2019/0018528 A1 | 1/2019 | Higano | |
| 2021/0026473 A1 | 1/2021 | Kim et al. | |

FOREIGN PATENT DOCUMENTS

| | | |
|---|---|---|
| JP | 2016-076146 A | 5/2016 |
| JP | 2016/194543 A1 | 12/2016 |
| JP | 2019-020448 A | 2/2019 |

* cited by examiner

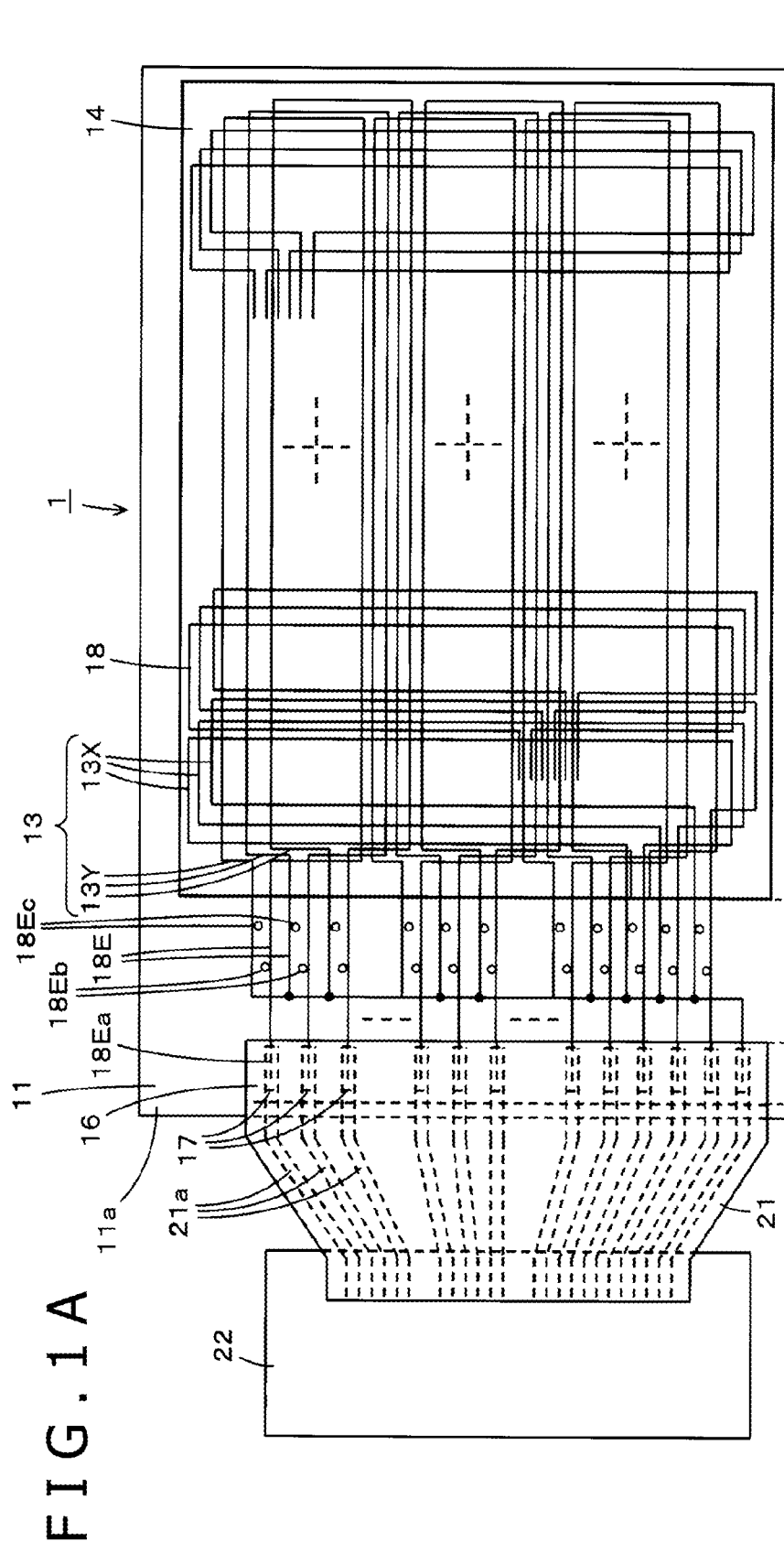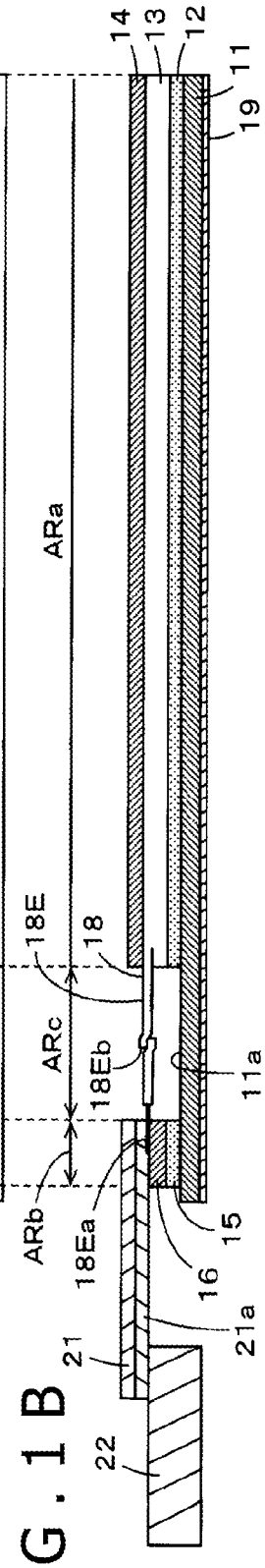

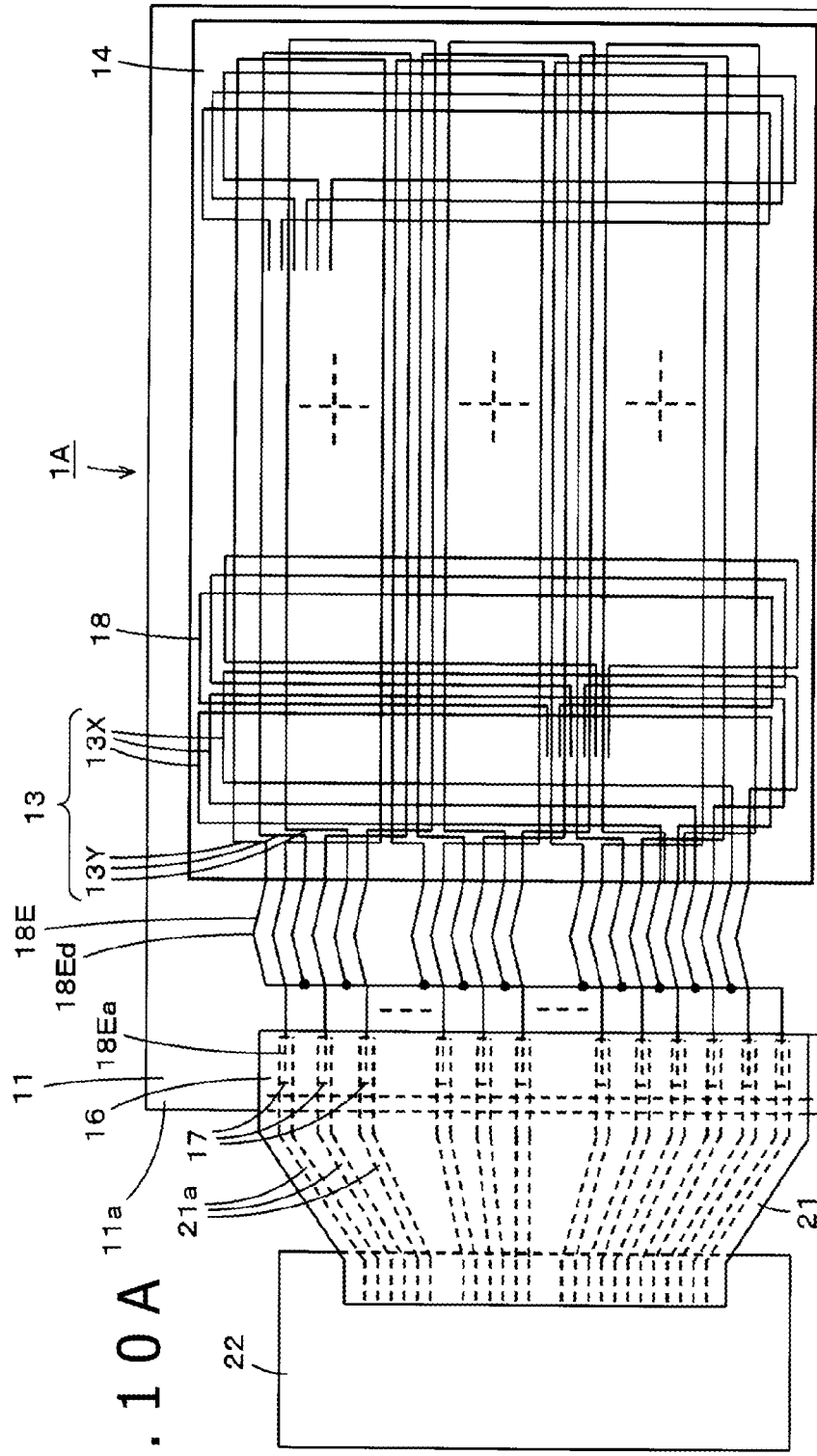
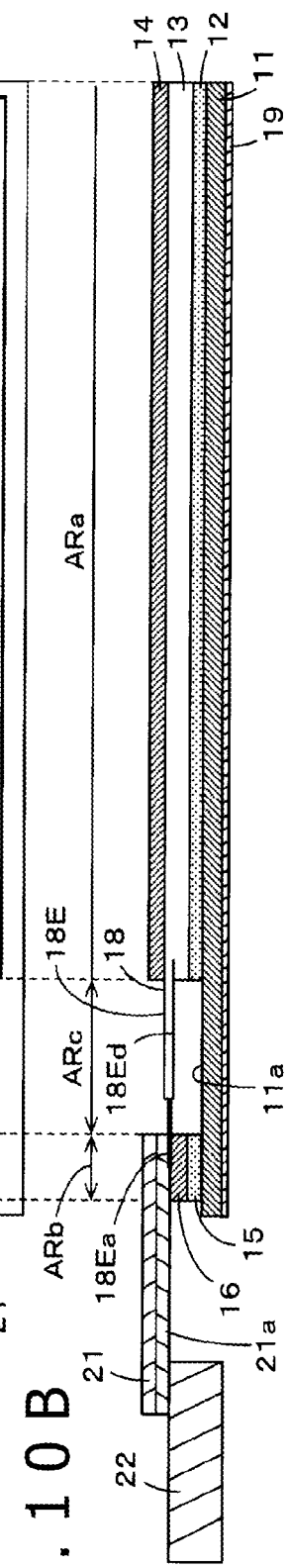
FIG.10A
FIG.10B

POSITION DETECTION SENSOR INCLUDING EXTENDABLE ELECTRODES IN A BENDABLE REGION AND METHOD FOR MANUFACTURING SUCH POSITION DETECTION SENSOR

BACKGROUND

Technical Field

This disclosure relates to a position detection sensor in which a plurality of electrode conductors are disposed on a base to detect a position indicated by a position indicator, and a method for manufacturing the position detection sensor.

Description of the Related Art

Known position detection sensors of this type typically include a board in the form of a sheet or a film, and a plurality of electrode conductors formed by copper foil patterns formed in predetermined patterns on the board through printing or deposition. Such known position detection sensor is disclosed in, for example, Japanese Patent Laid-Open No. 2013-186784.

In a case where the plurality of electrode conductors are disposed on the sheet-form or film-form board, in order to prevent the electrode conductors from overlapping each other, through holes are formed in the sheet-form or film-form board, and both a front surface and a rear surface of the sheet-form or film-form board are used on which the electrode conductors are formed.

Thus, the manufacturing process requires the formation of the through holes in the sheet-form or film-form board and the formation of electrode patterns on both the front and rear surfaces of the board, resulting in high manufacturing costs. The higher cost problem is exacerbated in a case of large-sized position detection sensors.

Meanwhile, Japanese Patent Laid-Open No. H7-253840 discloses a method for making a position detection sensor at low costs. In the method described in Japanese Patent Laid-Open No. H7-253840, the electrode conductor patterns are formed by arranging guide pins (i.e., pins for wiring) on a flat plate, sequentially connect these guide pins with coated conducting wires (i.e., insulated sensor wires), and folding over the plate to extend the coated conducting wires therealong.

In the position detection sensor described in Japanese Patent Laid-Open No. H7-253840, which is not provided with a terminal section, the coated conducting wires which form the electrode conductors are simply extended from the flat plate and led out to form lead portions. Accordingly, in order to connect an external circuit to each of the electrode conductors of the position detection sensor, it is necessary to remove the coated conducting wires of the lead portions to enable soldering of the lead portions, which is very cumbersome and makes mass production difficult.

To overcome this problem, another position detection sensor has been proposed (see WO 2016/194543), in which electrode conductors are formed by use of coated conducting wires on a base formed of a board in the shape of a sheet or a film, which contributes to reduction in costs, wherein a terminal section is provided on the base to facilitate connection with an external circuit.

In recent years, there have been provided input devices which include a position detection sensor disposed so as to overlap or coincide with a display screen of a display and capable of detecting an input operation performed on the display screen by a user using a position indicator. In a typical input device of this type, a detection region of the position detection sensor coincides with a display region of the display screen of the display, and an operation input at any position on the entire display screen can be detected as an operation input. In addition, with respect to the input devices of this type, there has been a demand for minimizing the size of an outer frame of the display screen, regardless of the size of the display.

However, in the position detection sensor disclosed in WO 2016/194543, the terminal section is formed on the same surface as electrode conductor patterns, and therefore the terminal section lies outside of the detection region, i.e., a region in which the electrode conductors are formed. Accordingly, a region of the terminal section lies outside of the detection region of the position detection sensor, which has the same size as that of the display screen of the display, and the size of the outer frame of the display screen is increased due to the region required for the terminal section.

BRIEF SUMMARY

The disclosure is directed to providing a position detection sensor that is able to overcome the above problems.

To solve the above problems, there is provided a position detection sensor including a base made of a flexible material. The base includes a terminal section having a plurality of terminal conductors formed on a first surface of the base. The base includes a sensor pattern section including a plurality of electrode conductors formed of coated conducting wires arranged in predetermined patterns and disposed on and adhered to the base via an adhesive in an area that does not overlap with the terminal section on the first surface of the base. End portions of the coated conducting wires of the plurality of electrode conductors are positioned so as to be connectable to corresponding ones of the terminal conductors in the terminal section. The first surface of the base includes a region of the terminal section, a region of the sensor pattern section, and a bendable region between these two regions. The end portions of the plurality of electrode conductors of the sensor pattern section are electrically connected to the plurality of terminal conductors in the terminal section through the bendable region, and each of the plurality of electrode conductors is disposed so as to be extensible (extendable) in the bendable region between the terminal section and the sensor pattern section.

In the position detection sensor having the above-described configuration, the bendable region lies between the sensor pattern section and the terminal section formed on the first surface of the base made of the flexible material, and therefore, the terminal section can be positioned on an opposite side of the base with respect to the first surface when the base is bent at the bendable region. As a result, substantially, only the sensor pattern section lies on the side of the base on which the first surface lies, and this makes it possible to reduce the size of an outer frame of a display screen of a display when the position detection sensor is disposed so as to overlap or coincide with the display screen.

In addition, in this case, the end portions of each of the plurality of electrode conductors of the sensor pattern section are typically arranged to extend up to the terminal section through the bendable region to be electrically connected to the terminal section. If portions of the electrode conductors which extend over the bendable region do not have extra room portions, a bending stress generated when the terminal section is bent to the side opposite to the side of the base on which the first surface lies may cause poor electrical connection between the end portions of the electrode conductors and the terminal section, or may even cause a break in the electrode conductors.

In contrast, in the position detection sensor having the above-described configuration, each of the plurality of electrode conductors is disposed so as to be extensible (extendable) between the terminal section and the sensor pattern section in the bendable region, and the portions of the electrode conductors which extend over the bendable region have extra room portions, which contributes to preventing a bending stress generated when the terminal section is bent to the side opposite to the side of the base on which the first surface lies from causing poor electrical connection between the end portions of the electrode conductors and the terminal section, or causing a break in the electrode conductors.

BRIEF DESCRIPTION OF THE DRAWINGS

FIGS. 1A and 1B are diagrams for explaining an example configuration of a position detection sensor according to an embodiment of the disclosure;

FIGS. 10A and 10B are diagrams for explaining an example configuration of a position detection sensor according to another embodiment of the disclosure.

DETAILED DESCRIPTION OF THE PREFERRED EMBODIMENTS

Figure 2A:
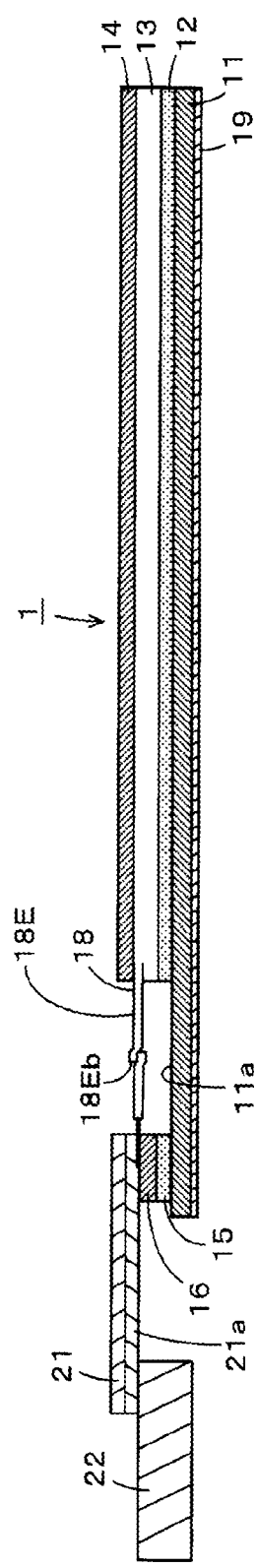
FIGS. 2A and 2B are diagrams for explaining the example configuration of the position detection sensor according to the embodiment of the disclosure.

Hereinafter, position detection sensors according to embodiments of the disclosure will be described with reference to the accompanying drawings.
Position Detection Sensor According to Embodiment A position detection sensor according to an embodiment of the disclosure will be described below. The position detection sensor employs an electromagnetic induction method, and includes a sensor pattern section including a plurality of electrode conductors. Each of the electrode conductors has a loop coil pattern.

FIGS. 1A and 1B are diagrams for explaining the configuration of a position detection sensor 1 according to this embodiment. FIG. 1A is a diagram illustrating a surface of the position detection sensor 1 on which a sensor pattern section 13 is formed as viewed in a direction perpendicular to that surface. FIG. 1B is a schematic diagram illustrating the configuration of a cross-section of the position detection sensor 1.

As illustrated in FIGS. 1A and 1B, the position detection sensor 1 according to this embodiment includes the sensor pattern section 13 and a base (i.e., a board) 11 which is in the shape of a rectangular sheet or film and which is made of a flexible insulating material, e.g., polyethylene terephthalate (PET). The sensor pattern section 13 includes a plurality of loop coils, i.e., a plurality of electrode conductors, and is disposed on and adhered to a first surface 11a of the base 11 via an adhesive 12. A flexible board may be used as the base 11.

In this embodiment, the sensor pattern section 13 lies in a rectangular region ARa on the first surface 11a of the rectangular base 11. The rectangular region ARa extends over most of the base 11 in a vertical direction, and extends over a right-hand portion of the base 11 in a lateral direction exclusive of a left-hand portion. A rectangular protection sheet 14 made of an insulating material, e.g., PET, is disposed so as to cover an entire exposed surface of the sensor pattern section 13. In the sensor pattern section 13, space (air space) is formed except where the electrode conductors lie, and the protection sheet 14 is adhered and joined to the base 11 via the adhesive 12 through the space of the sensor pattern section 13.

In addition, in this embodiment, a terminal section 16 is adhered, via an adhesive 15, to a lateral end portion of the left-hand portion of the first surface 11a of the base 11 on which the sensor pattern section 13 is not disposed. In other words, the terminal section 16 is provided in a region ARb corresponding to a lateral edge portion of the base 11, the region ARb not overlapping with the region ARa in which the sensor pattern section 13 is disposed. In this embodiment, the terminal section 16 includes a board which is in the shape of a sheet or a film and which is made of an insulating material, e.g., PET, and terminal conductors 17 formed on the board by, for example, printing or the like. The terminal conductors 17 are formed by copper foil patterns to be electrically connected to the corresponding electrode conductors of the sensor pattern section 13.

In this embodiment, a bendable region ARc is provided between the region ARa of the sensor pattern section 13 and the region ARb of the terminal section 16 in the lateral direction of the base 11. In this embodiment, the upper side of each of the bendable region ARc and the region ARb of the terminal section 16 is not covered with the protection sheet 14. In addition, the adhesive 15 is not applied to the bendable region ARc. The bendable region ARc is arranged to have a necessary and sufficient dimension in the lateral direction of the base 11 to allow the base 11 to be bent such that a portion of the bendable region ARc, which extends from a vicinity of a lateral end portion of the region ARa of the sensor pattern section 13 is bent to place an end portion of the base 11 toward the terminal section 16 side on an opposite side of the base 11 with respect to the first surface 11a (see FIG. 2B).

As illustrated in FIG. 1A, the sensor pattern section 13 includes a plurality of loop coils, which are examples of the plurality of electrode conductors. In this embodiment, the plurality of loop coils include a plurality of X-axis direction loop coils 13X and a plurality of Y-axis direction loop coils 13Y.

Each of the X-axis direction loop coils 13X is formed by a rectangular loop coil having a longitudinal direction parallel to the vertical direction (i.e., a Y-axis direction of a coordinate system) of the base 11, and the plurality of X-axis direction loop coils 13X are arranged at predetermined intervals in the lateral direction (i.e., an X-axis direction of the coordinate system) of the base 11. Meanwhile, each of the Y-axis direction loop coils 13Y is formed by a rectangular loop coil having a longitudinal direction parallel to the lateral direction of the base 11, and the Y-axis direction loop coils 13Y are arranged at predetermined intervals in the vertical direction of the base 11.

In this embodiment, the plurality of X-axis direction loop coils 13X and the plurality of Y-axis direction loop coils 13Y of the sensor pattern section 13 are each formed of a coated conducting wire 18, and are disposed on the first surface 11a of the base 11 so that they can (partially) overlap with each other. In this case, as illustrated in FIG. 1A, each of the X-axis direction loop coils 13X and the Y-axis direction loop coils 13Y is disposed at a predetermined position on the first surface 11a of the base 11 so as to have a predetermined pattern.

In addition, in this embodiment, as illustrated in FIGS. 1A and 1B, both end portions 18E of each of the X-axis direction loop coils 13X and the Y-axis direction loop coils 13Y are disposed so as to extend from the protection sheet 14 in the lateral direction toward the terminal section 16 beyond a lateral edge of the region ARa of the sensor pattern section 13 toward the terminal section 16 side, and traverses across the bendable region ARc to the region ARb of the terminal section 16. At this time, a position at which the both end portions 18E of each of the X-axis direction loop coils 13X and the Y-axis direction loop coils 13Y are led out from the sensor pattern section 13 is aligned with the position of a corresponding one of the terminal conductors 17 in the terminal section 16 to which the both end portions 18E are determined to be connected.

In other words, the both end portions 18E of each of the X-axis direction loop coils 13X and the Y-axis direction loop coils 13Y are arranged to lie over the corresponding terminal conductor 17 in the terminal section 16 when the both end portions 18E are extended in a straight line across the bendable region ARc in the lateral direction from the lateral edge of the region ARa of the sensor pattern section 13 on the side on which the terminal section 16 lies.

Then, in this embodiment, as illustrated in FIG. 1B, an insulating coating of the coated conducting wire 18 is removed, resulting in an exposure of a conducting wire, at a tip portion 18Ea of the both end portions 18E of each of the X-axis direction loop coils 13X and the Y-axis direction loop coils 13Y, and the tip portion 18Ea, at which the conducting wire is exposed, is positioned on the corresponding terminal conductor 17 in the terminal section 16.

Although not illustrated in the figures, the tip portion 18Ea of the both end portions 18E of each of the X-axis direction loop coils 13X and the Y-axis direction loop coils 13Y is electrically connected to the corresponding one of the terminal conductors 17 in the terminal section 16 through, for example, soldering. For example, a solder is applied onto each of the terminal conductors 17 in the terminal section 16 in advance, and the solder on each of the terminal conductors 17 in the terminal section 16 is heated, with the corresponding tip portions 18Ea of the both end portions 18E of the X-axis direction loop coils 13X and the Y-axis direction loop coils 13Y positioned thereon, to thereby solder each of the terminal conductors 17 in the terminal section 16 to the corresponding one of the tip portions 18Ea of the both end portions 18E of the X-axis direction loop coils 13X and the Y-axis direction loop coils 13Y.

Then, a metal sheet 19, which is an example of an electromagnetic shielding layer, is adhered so as to cover an entire surface of the base 11 on the side opposite to the first surface 11a. In this embodiment, the metal sheet 19 includes an aluminum sheet and an amorphous sheet. The amorphous sheet of the metal sheet 19 prevents electromagnetic waves radiating from the sensor pattern section 13 from escaping to the outside on the opposite side of the base 11 of the first surface 11a, while the aluminum sheet serves to prevent introduction of noise from the outside on the opposite side of the base 11 of the first surface 11a into the sensor pattern section 13. Note that the metal sheet 19 may be adhered so as to cover not the entire surface of the base 11 on the side opposite to the first surface 11a, but so as to cover only a region of a back surface of the base 11 on the side opposite to the first surface 11a, the region corresponding to the region ARa of the sensor pattern section 13.

As described above, in the position detection sensor 1 according to this embodiment, the sensor pattern section 13 including the X-axis direction loop coils 13X and the Y-axis direction loop coils 13Y are formed by use of the coated conducting wires 18, and the sensor pattern section 13 is fixed between the base 11 and the protection sheet 14 via the adhesive 12. The position detection sensor 1 can thus be manufactured at low costs.

In addition, in the position detection sensor 1 according to the above-described embodiment, the terminal section 16 in which the terminal conductors 17 are formed in advance is formed on the first surface 11a of the base 11, and the tip portions 18Ea of the both end portions 18E of the coated conducting wires 18 of the loop coils of the sensor pattern section 13 are positioned so as to be capable of being connected to the corresponding terminal conductors 17 in the terminal section 16. Thus, the tip portions 18Ea can be easily electrically connected to the corresponding terminal conductors 17 in the terminal section 16 through, for example, soldering.

Therefore, the position detection sensor 1 according to this embodiment, in which the electrode conductors are formed by use of the coated conducting wires 18, can be provided at low costs and has a simple configuration, and can be very easily connected to an external circuit through use of the terminal section 16.

In this embodiment, a circuit board 22 is connected to the terminal section 16 via a flexible board 21. In this case, the flexible board 21 has formed thereon conductive patterns 21a each electrically connected to a corresponding one of the terminal conductors 17 in the terminal section 16. Specifically, one end of each of the conductive patterns 21a is electrically connected to the corresponding terminal conductor 17 in the terminal section 16, while another end thereof is electrically connected to a corresponding one of terminal conductors (not depicted in the figures) in a connector terminal section of the circuit board 22. A position detection circuit as described below is formed on the circuit board 22.

Figure 2B:
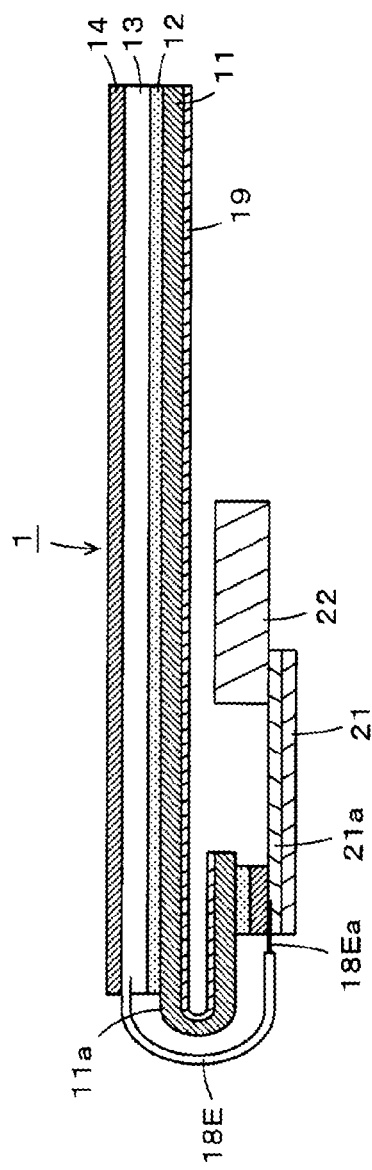

Then, as illustrated in FIGS. 2A and 2B, the position detection sensor 1 is configured such that the base 11 is bent at the bendable region ARc and folded over to the side opposite to the side on which the first surface 11a lies, so that, in this embodiment, the terminal section 16, the flexible board 21, and the circuit board 22 are positioned on the opposite side of the base 11 with respect to the first surface 11a. Note that FIG. 2A, which is a diagram for clarifying a state in which the position detection sensor 1 is bent as illustrated in FIG. 2B, is the same diagram as FIG. 1B.

Accordingly, the region ARb of the terminal section 16 and a large part of the bendable region ARc of the base 11 are positioned on the opposite side of the base 11 with respect to the first surface 11a, so that, substantially, only the sensor pattern section 13 lies on the side of the base 11 on which the first surface 11a lies. This leads to a reduction in the size of a frame region when the position detection sensor 1 according to this embodiment is disposed so as to overlap or coincide with a display screen of a display device.

In this case, the both end portions 18E of each of the X-axis direction loop coils 13X and the Y-axis direction loop coils 13Y of the sensor pattern section 13 are arranged to extend, across the bendable region ARc, up to the region ARb of the terminal section 16, and are electrically connected to the terminal section 16. In this case, if the both end portions 18E of each of the X-axis direction loop coils 13X and the Y-axis direction loop coils 13Y are arranged to extend in a straight line, across the bendable region ARc, up to the region ARb of the terminal section 16, a portion of each of the both end portions 18E which extends in the bendable region ARc may not have an extra room portion, and a bending stress generated when the terminal section 16 is bent to the side opposite to the side of the base 11 on which the first surface 11a lies might cause poor electrical connection between the tip portion 18Ea of the both end portions 18E and the corresponding terminal conductor 17 in the terminal section 16, or may cause a break in the coated conducting wire 18.

In view of this point, in this embodiment, the both end portions 18E of each of the X-axis direction loop coils 13X and the Y-axis direction loop coils 13Y are not disposed to join the sensor pattern section 13 and the terminal section 16 in a straight line, but are disposed so as to be extensible (extendable) in the bendable region ARc between the terminal section 16 and the sensor pattern section 13.

That is, in this embodiment, within the range of the bendable region ARc between the terminal section 16 and the sensor pattern section 13, the both end portions 18E of each of the X-axis direction loop coils 13X and the Y-axis direction loop coils 13Y are arranged to have extra room portions formed by non-straight portions in the bendable region ARc, and are thus disposed so as to be extensible in the bendable region ARc.

In the embodiment illustrated in FIGS. 1A and 1B, the extra room portions formed by the non-straight portions are formed by extra wound (looped) portions 18Eb and 18Ec obtained by winding (looping) portions of the both end portions 18E of the coated conducting wire 18 of each of the X-axis direction loop coils 13X and the Y-axis direction loop coils 13Y in the bendable region ARc into coils having one or more turns. As described below, in this embodiment, each of the extra wound portions 18Eb and 18Ec is formed by winding the coated conducting wire around a guide pin that is used when patterns of the X-axis direction loop coils 13X and the Y-axis direction loop coils 13Y are formed on the sensor pattern section 13.

As described above, the both end portions 18E of each of the X-axis direction loop coils 13X and the Y-axis direction loop coils 13Y are disposed and formed so as to have the extra wound portions 18Eb and 18Ec, which are extensible in the bendable region ARc between the terminal section 16 and the sensor pattern section 13. Accordingly, even when the base 11 of the position detection sensor 1 according to this embodiment is bent at the bendable region ARc to the side opposite to the side of the base 11 on which the first surface 11a lies, the coated conducting wire 18 at the both end portions 18E of each of the X-axis direction loop coils 13X and the Y-axis direction loop coils 13Y in the bendable region ARc is provided with a margin against a bending stress thanks to the extra wound portions 18Eb and 18Ec. This helps to prevent poor electrical connection between the tip portion 18Ea of the both end portions 18E and the corresponding terminal conductor 17 in the terminal section 16, and prevent a break in the coated conducting wire 18.

Figure 3:
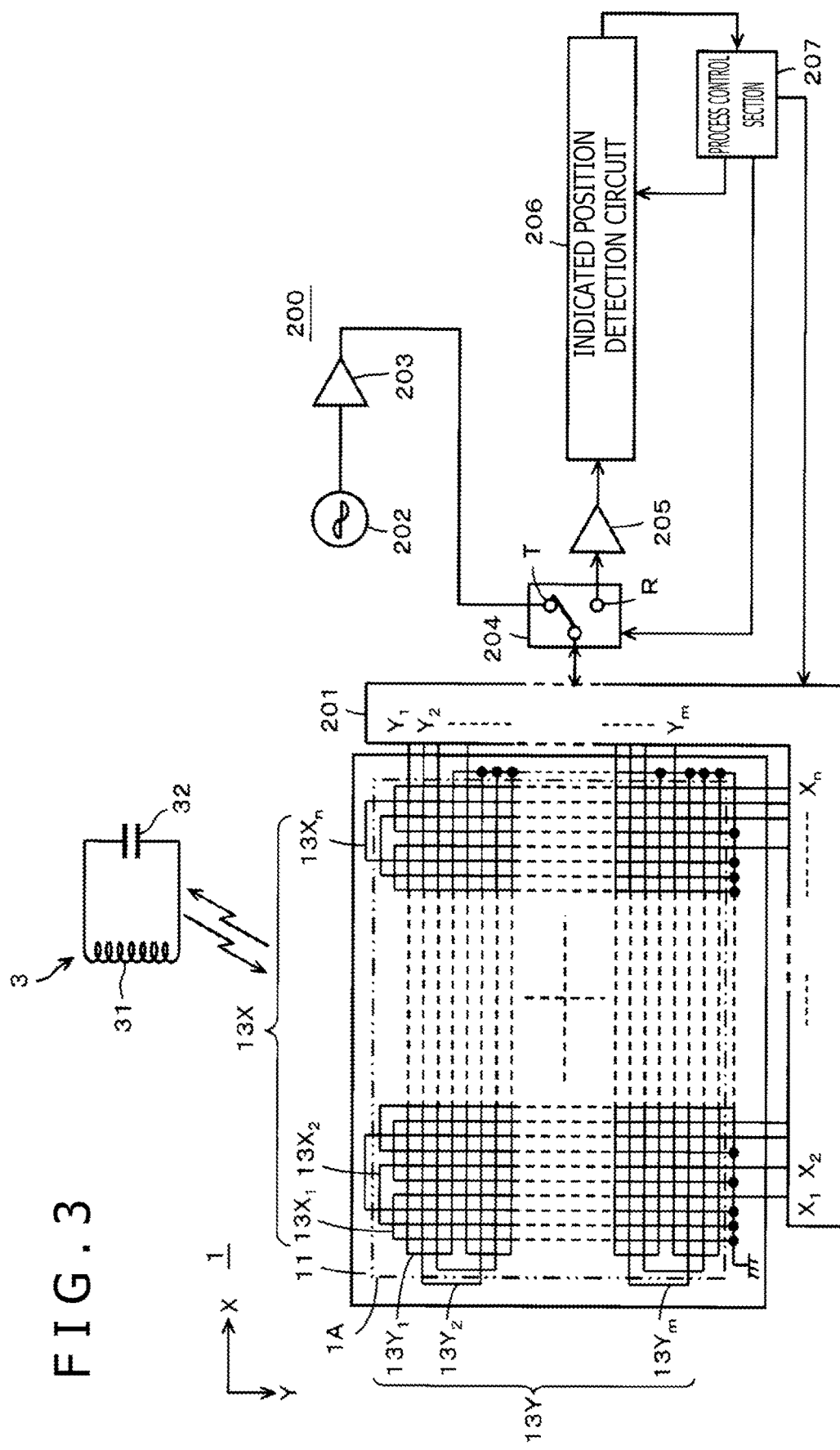
FIG. 3 is a diagram for explaining an example configuration of a position detection circuit connected to the position detection sensor according to the embodiment of the disclosure.

Position Detection Circuit That Uses Position Detection Sensor According to Embodiment Next, an example configuration of a position detection circuit 200 which employs the electromagnetic induction method and which is formed on the circuit board 22 of the position detection sensor 1 according to the above-described embodiment will be described below with reference to FIG. 3. As illustrated in FIG. 3, a pen-type position indicator 3, which is used together with the position detection sensor 1 according to this embodiment, incorporates a resonant circuit including a coil 31 and a capacitor 32 connected in parallel with the coil 31.

In the example of FIG. 3, the X-axis direction loop coils 13X are made up of n rectangular loop coils $13X_1$ to $13X_n$ (where n is an integer equal to or greater than two) arranged in the X-axis direction, while the Y-axis direction loop coils 13Y are made up of m loop coils $13Y_1$ to $13Y_m$ (where m is an integer equal to or greater than two) arranged in the Y-axis direction.

In the example of FIG. 3, the position detection circuit 200 includes a selection circuit 201, an oscillator 202, a current driver 203, a transmission/reception switching circuit 204, a receiving amplifier 205, an indicated position detection circuit 206, and a process control section 207.

The selection circuit 201 selects the plurality of X-axis direction loop coils 13X and the plurality of Y-axis direction loop coils 13Y one after another, and causes the selected loop coil to transmit a signal to the position indicator 3 and receive a signal returned from the position indicator 3.

The transmission/reception switching circuit 204, which is controlled by the process control section 207 to perform switching, is connected to the selection circuit 201. When the transmission/reception switching circuit 204 is connected to a transmission-side terminal T, an alternating-current signal is supplied from the oscillator 202 to the selection circuit 201, while, when the transmission/reception switching circuit 204 is connected to a reception-side terminal R, a signal from the selection circuit 201 is supplied to the indicated position detection circuit 206 via the receiving amplifier 205.

The indicated position detection circuit 206 detects induced voltages, i.e., reception signals, generated in the loop coils of the position detection sensor 1, converts the detected output signals to digital signals, and outputs the digital signals to the process control section 207. The process control section 207 calculates coordinate values of a position indicated by the position indicator 3 in the X-axis direction and the Y-axis direction on the basis of the digital signals from the indicated position detection circuit 206, i.e., the level of the voltage value of the induced voltage generated in each loop coil.

Method for Manufacturing Position Detection Sensor 1 According to Embodiment

Figure 4:
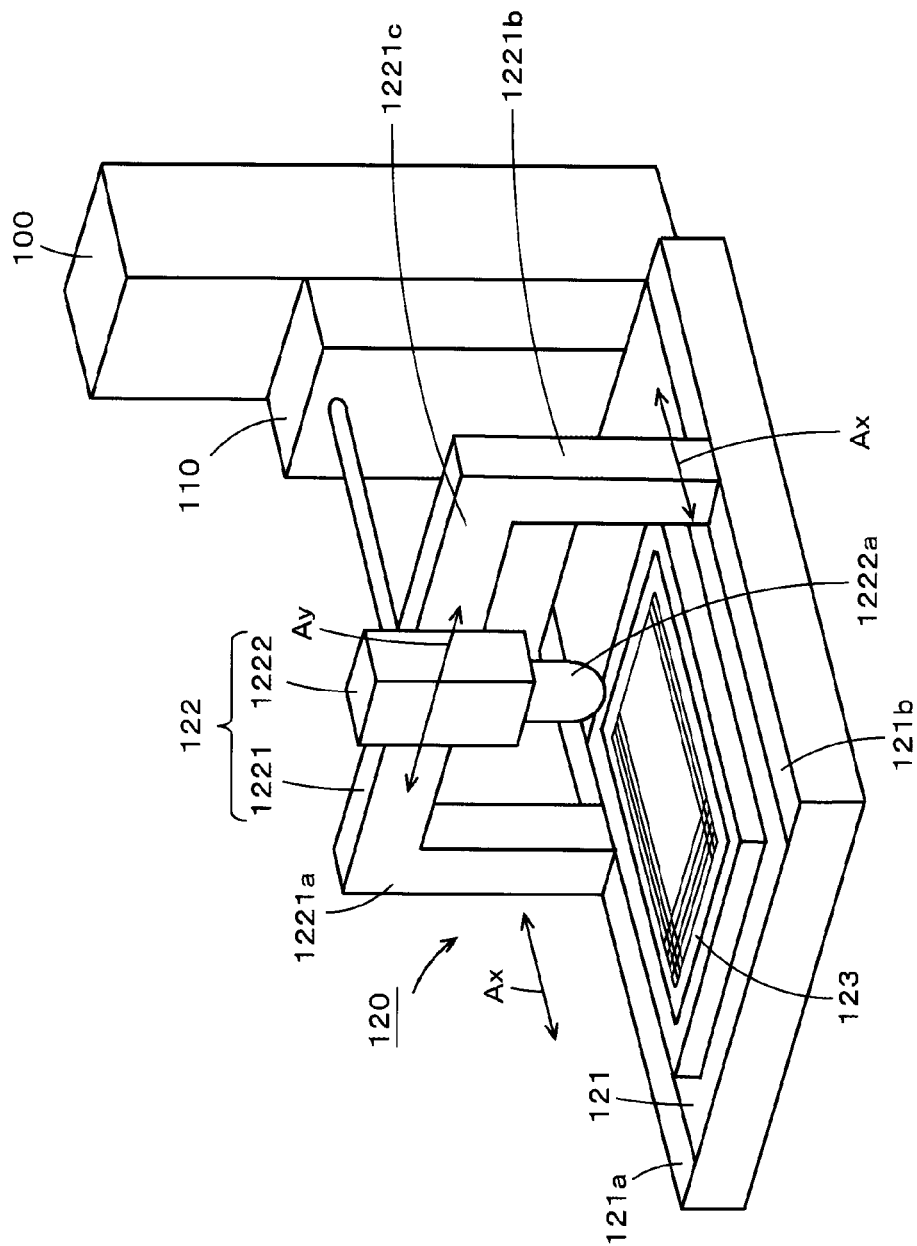
FIG. 4 is a diagram for explaining an example of an apparatus for manufacturing the position detection sensor according to the embodiment of the disclosure.
Figure 5:
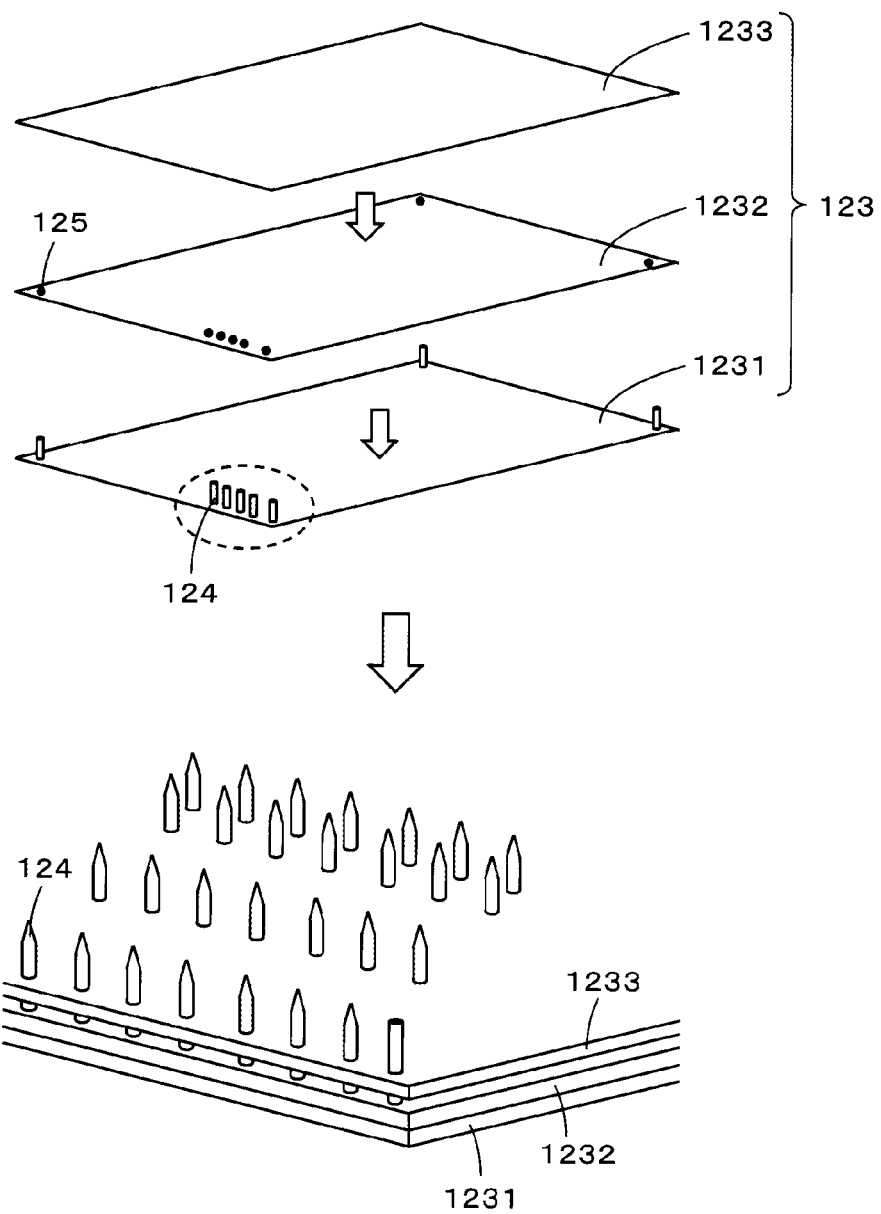
FIG. 5 is a diagram for explaining an example of a method for manufacturing the position detection sensor according to the embodiment of the disclosure.

Next, a method for manufacturing the position detection sensor 1 according to an embodiment of this disclosure will now be described below. FIGS. 4 and 5 are diagrams for explaining the method for manufacturing the position detection sensor 1 according to an embodiment. FIG. 4 is a diagram illustrating an example structure of an apparatus for manufacturing the position detection sensor which employs the manufacturing method according to this embodiment. The apparatus for manufacturing the position detection sensor according to this embodiment includes a wire feeding unit 100, a preprocessing unit 110, and a wiring unit 120.

The wiring unit 120 includes a workbench 121 for forming the position detection sensor 1, and a two-axis moving wiring instrument 122 provided on the workbench 121. The two-axis moving wiring instrument 122 includes a moving bridge 1221 capable of sliding in the X-axis direction (see the direction indicated by arrows Ax in FIG. 4) of the position detection sensor 1, and a wiring nozzle mechanism 1222 capable of sliding in the Y-axis direction (see the direction indicated by an arrow Ay in FIG. 4) of the position detection sensor 1.

The moving bridge 1221 includes two leg portions 1221a and 1221b, and a bridging portion 1221c that extends between the two leg portions 1221a and 1221b so as to span the position detection sensor 1 in a direction along the Y-axis direction thereof. The two leg portions 1221a and 1221b of the moving bridge 1221 are mounted on two rails 121a and 121b, respectively, each extending in the X-axis direction on the workbench 121, and the moving bridge 1221 slides in the X-axis direction while being guided by the two rails 121a and 121b with the bridging portion 1221c being kept parallel to the Y-axis direction.

The wiring nozzle mechanism 1222 is attached to the bridging portion 1221c of the moving bridge 1221 so as to be capable of moving in the direction of bridging (i.e., the Y-axis direction of the position detection sensor 1 (see the direction indicated by the arrow Ay in FIG. 4)). A wire nozzle 1222a is attached to a portion of the wiring nozzle mechanism 1222 which faces a surface of the workbench 121. A coated conducting wire subjected to preprocessing in the preprocessing unit 110 is drawn out through an outlet of the wire nozzle 1222a.

The above configuration enables the wire nozzle 1222a to move in any desired direction over a two-dimensional plane of the workbench 121 through the sliding of the moving bridge 1221 in the X-axis direction and the sliding of the wiring nozzle mechanism 1222 in the Y-axis direction in the two-axis moving wiring instrument 122.

The two-axis moving wiring instrument 122 is provided with a movement control section, which is not depicted in FIG. 4, and the sliding of the moving bridge 1221 in the X-axis direction and the sliding of the wiring nozzle mechanism 1222 in the Y-axis direction are controlled by the movement control section. In addition, in this embodiment, information as to a locus of movement of the wire nozzle 1222a for disposing each of the plurality of X-axis direction loop coils 13X and each of the plurality of Y-axis direction loop coils 13Y is stored in advance in the movement control section.

On the basis of the stored information, the movement control section of the two-axis moving wiring instrument 122 controls the sliding of the moving bridge 1221 in the X-axis direction and the sliding of the wiring nozzle mechanism 1222 in the Y-axis direction to control the wire nozzle 1222a to move so as to dispose each of the plurality of X-axis direction loop coils 13X and each of the plurality of Y-axis direction loop coils 13Y.

A pin table 123, which has disposed thereon guide pins for guiding the coated conducting wires so as to form the patterns of the X-axis direction loop coils 13X and the Y-axis direction loop coils 13Y, is provided on the workbench 121 of the wiring unit 120.

FIG. 5 is a diagram for explaining an example configuration of the pin table 123. As illustrated in an upper portion of FIG. 5, the pin table 123 includes a guide pin mounting plate 1231, an intermediate plate 1232, and a release sheet 1233. In addition, the pin table 123 is formed by joining the guide pin mounting plate 1231, the intermediate plate 1232, and the release sheet 1233 together as illustrated in a lower portion of FIG. 5. Note that a diagram of the pin table 123 in the lower portion of FIG. 5 represents an enlarged view of an area corresponding to an area enclosed by a dashed line in a diagram in the upper portion of FIG. 5.

The guide pin mounting plate 1231 has mounted thereon a large number of guide pins 124 for guiding the coated conducting wires discharged from the wire nozzle 1222a so as to form each of the plurality of X-axis direction loop coils 13X and each of the plurality of Y-axis direction loop coils 13Y. In FIG. 5, the guide pins 124 mounted only on an end portion of the guide pin mounting plate 1231 are depicted for the purpose of illustration, but in actuality, the guide pins 124 are mounted at least at points at which the plurality of X-axis direction loop coils 13X and the plurality of Y-axis direction loop coils 13Y are bent.

The intermediate plate 1232 is disposed between the guide pin mounting plate 1231 and the release sheet 1233, and as illustrated in FIG. 5, the intermediate plate 1232 includes holes 125 defined at positions corresponding to those of the guide pins 124 mounted on the guide pin mounting plate 1231.

The release sheet 1233 is disposed on the intermediate plate 1232 adhered to the guide pin mounting plate 1231. At this time, the guide pins 124 pierce into and through the release sheet 1233, so that tips of the guide pins 124 project above the release sheet 1233. Note that, in this embodiment, each guide pin 124 is arranged to have a sharp tip like a tip of a needle.

As described above, the guide pin mounting plate 1231, the intermediate plate 1232, and the release sheet 1233 are joined together as illustrated in the lower portion of FIG. 5, so that the pin table 123, having the large number of guide pins 124 mounted at predetermined positions, is formed.

Then, with the coated conducting wire drawn out from the wire nozzle 1222a of the wiring nozzle mechanism 1222, each of the plurality of X-axis direction loop coils 13X and the plurality of Y-axis direction loop coils 13Y is formed as a predetermined loop coil pattern on the release sheet 1233 of the pin table 123, so that the sensor pattern section 13 is formed. A surface of the release sheet 1233 has been subjected to a treatment that enables the formed sensor pattern section 13 to be easily separated from the pin table 123.

Using the apparatus for manufacturing the position detection sensor which has the above-described configuration, the position detection sensor 1 is manufactured by a procedure as described below. Note that the apparatus for manufacturing the position detection sensor illustrated in FIG. 4 performs the manufacture of the position detection sensor 1 based on a sequence control section (not depicted in the figures) performing sequence control of an operation of each of the wire feeding unit 100, the preprocessing unit 110, and the wiring unit 120.

Figure 6:
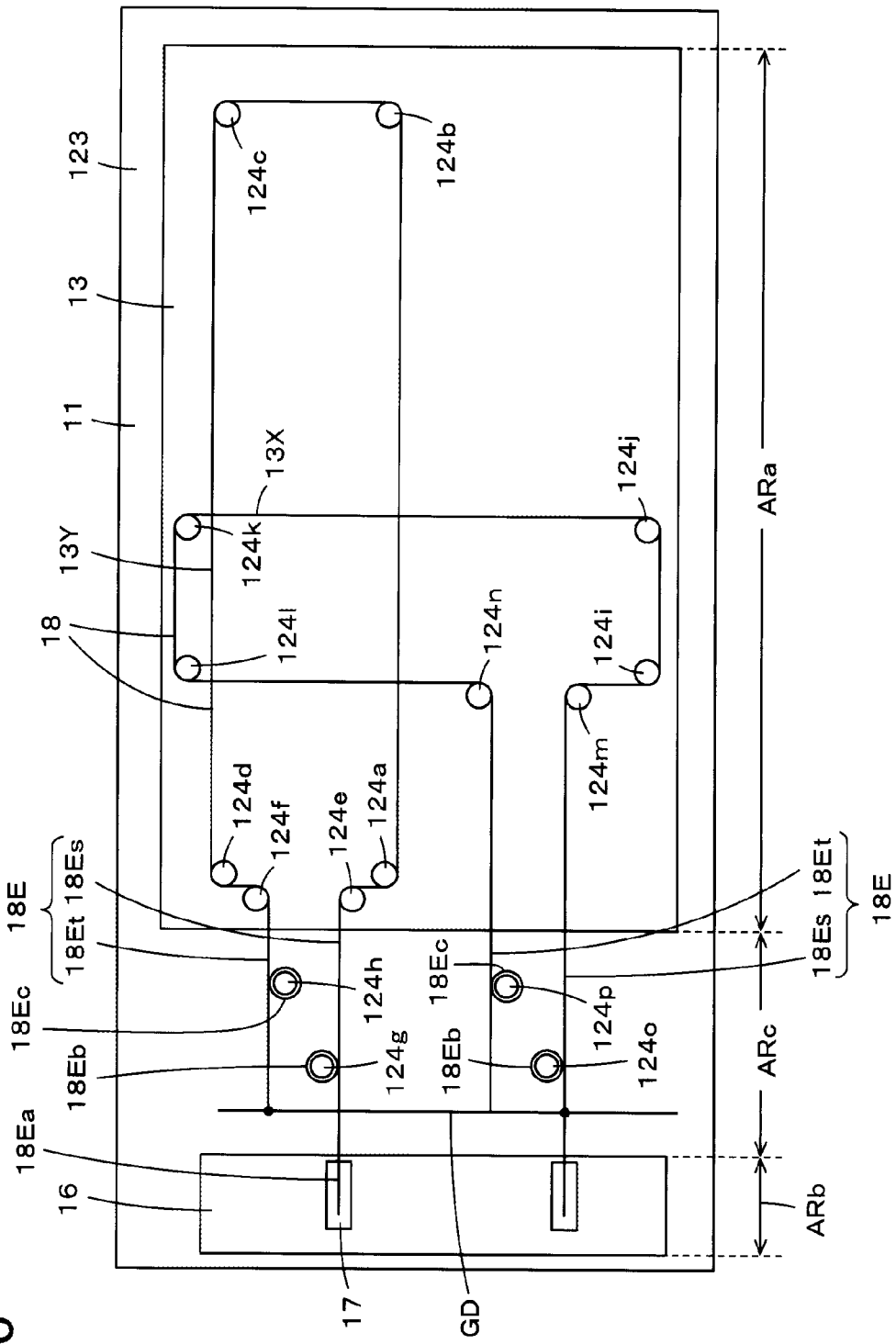
FIG. 6 is a diagram for explaining an example of the method for manufacturing the position detection sensor according to the embodiment of the disclosure.

Before an overall flow of steps of the method for manufacturing the position detection sensor according to this embodiment is described, the following describes the positions at which the guide pins 124 required to form one of the Y-axis direction loop coils 13Y and one of the X-axis direction loop coils 13X are disposed on the pin table 123, and formation of the patterns of these loop coils 13Y and 13X with reference to FIG. 6.

First, the case of the Y-axis direction loop coil 13Y will be described. As illustrated in FIG. 6, four guide pins 124a, 124b, 124c, and 124d for forming the Y-axis direction loop coil 13Y in a horizontally oriented rectangular shape, and two guide pins 124e and 124f for defining the positions at which the both end portions 18E of the Y-axis direction loop coil 13Y are led out, are disposed in a region of the pin table 123 to which the region ARa of the sensor pattern section 13 in the base 11 corresponds.

In addition, guide pins 124g and 124h for forming the extra wound portions 18Eb and 18Ec, respectively, which are examples of the extra room portions formed by non-straight portions, are disposed in the bendable region ARc.

As described below, the coated conducting wire 18 is led along the guide pins 124a to 124d, 124e, and 124f as illustrated in FIG. 6, so that the rectangular Y-axis direction loop coil 13Y is formed in the region ARa of the sensor pattern section 13, and the both end portions 18E of the coated conducting wire 18 of the Y-axis direction loop coil 13Y are arranged to extend from the region ARa of the sensor pattern section 13 across the bendable region ARc to the region ARb of the terminal section 16.

In this case, as illustrated in FIG. 6, the both end portions 18E of the Y-axis direction loop coil 13Y include a first end portion 18Es and a second end portion 18Et, and the position at which the first end portion 18Es is led out is aligned with the position of the corresponding terminal conductor 17 in the terminal section 16. Accordingly, when the first end portion 18Es of the both end portions 18E of the Y-axis direction loop coil 13Y is extended in a straight line across the bendable region ARc, the first end portion 18Es can be connected to the corresponding terminal conductor 17 in the terminal section 16. However, in this embodiment, the first end portion 18Es is not arranged to extend in a straight line, but, as illustrated in FIG. 6, is arranged to have the extra wound portion 18Eb formed by winding the first end portion 18Es one or more times around the guide pin 124g in the bendable region ARc.

In addition, as illustrated in FIG. 6, the second end portion 18Et of the both end portions 18E of the Y-axis direction loop coil 13Y is arranged to have the extra wound portion 18Ec formed by winding the second end portion 18Et one or more times around the guide pin 124h in the bendable region ARc.

Then, in the position detection sensor 1 according to this embodiment, the second end portions 18Et of the both end portions 18E of the plurality of Y-axis direction loop coils 13Y are commonly connected to an earth wire portion GD, which is connected to a terminal conductor connected to an earth electrode in the terminal section 16 as illustrated in FIG. 1A. The extra wound portion 18Ec of the second end portion 18Et is formed in the bendable region ARc between the earth wire portion GD and the position at which the second end portion 18Et is led out from the sensor pattern section 13.

Next, in a case of the X-axis direction loop coil 13X, similarly, as illustrated in FIG. 6, four guide pins 124i, 124j, 124k, and 124l for forming the X-axis direction loop coil 13X in a vertically oriented rectangular shape, and two guide pins 124m and 124n for defining the positions at which the both end portions 18E of the X-axis direction loop coil 13X are led out, are disposed in the region of the pin table 123 to which the region ARa of the sensor pattern section 13 in the base 11 corresponds.

Then, the coated conducting wire 18 is led along the guide pins 124i to 124l, 124m, and 124n as illustrated in FIG. 6, so that the rectangular X-axis direction loop coil 13X is formed in the region ARa of the sensor pattern section 13, and the both end portions 18E of the coated conducting wire 18 of the X-axis direction loop coil 13X are arranged to extend from the region ARa of the sensor pattern section 13 across the bendable region ARc to the region ARb of the terminal section 16.

Then, as illustrated in FIG. 6, the position at which a first end portion 18Es of the both end portions 18E of the X-axis direction loop coil 13X is led out is aligned with the position of the corresponding terminal conductor 17 in the terminal section 16, so that the first end portion 18Es can be connected to the corresponding terminal conductor 17 in the terminal section 16 if the first end portion 18Es is arranged to extend in a straight line across the bendable region ARc.

Then, as is similarly the case with the Y-axis direction loop coil 13Y, as illustrated in FIG. 6, the first end portion 18Es and a second end portion 18Et of the both end portions of the X-axis direction loop coil 13X are arranged to have the extra wound portion 18Eb and the extra wound portion 18Ec formed by winding the first end portion 18Es and the second end portion 18Et one or more times around guide pins 124o and 124p, respectively, in the bendable region ARc.

Then, tip portions of the second end portions 18Et of the both end portions 18E of the plurality of X-axis direction loop coils 13X are commonly connected to the earth wire portion GD, which is connected to the terminal conductor 17 connected to the earth electrode in the terminal section 16 as illustrated in FIG. 1A.

The extra wound portions 18Eb and 18Ec, which are formed in the both end portions 18E of the Y-axis direction loop coils 13Y and the X-axis direction loop coils 13X in the bendable region ARc as described above, are pulled out of the guide pins 124g, 124h, 124o, and 124p to form hollow coils, and serve as extra room portions that are extensible in the lateral direction of the base 11. Accordingly, when the base 11 is bent in the bendable region ARc as described above, the extra wound portions 18Eb and 18Ec serve as extra extensible portions of the coated conducting wires 18 to prevent the abovementioned problems that could be caused by a bending stress.

Figure 7:
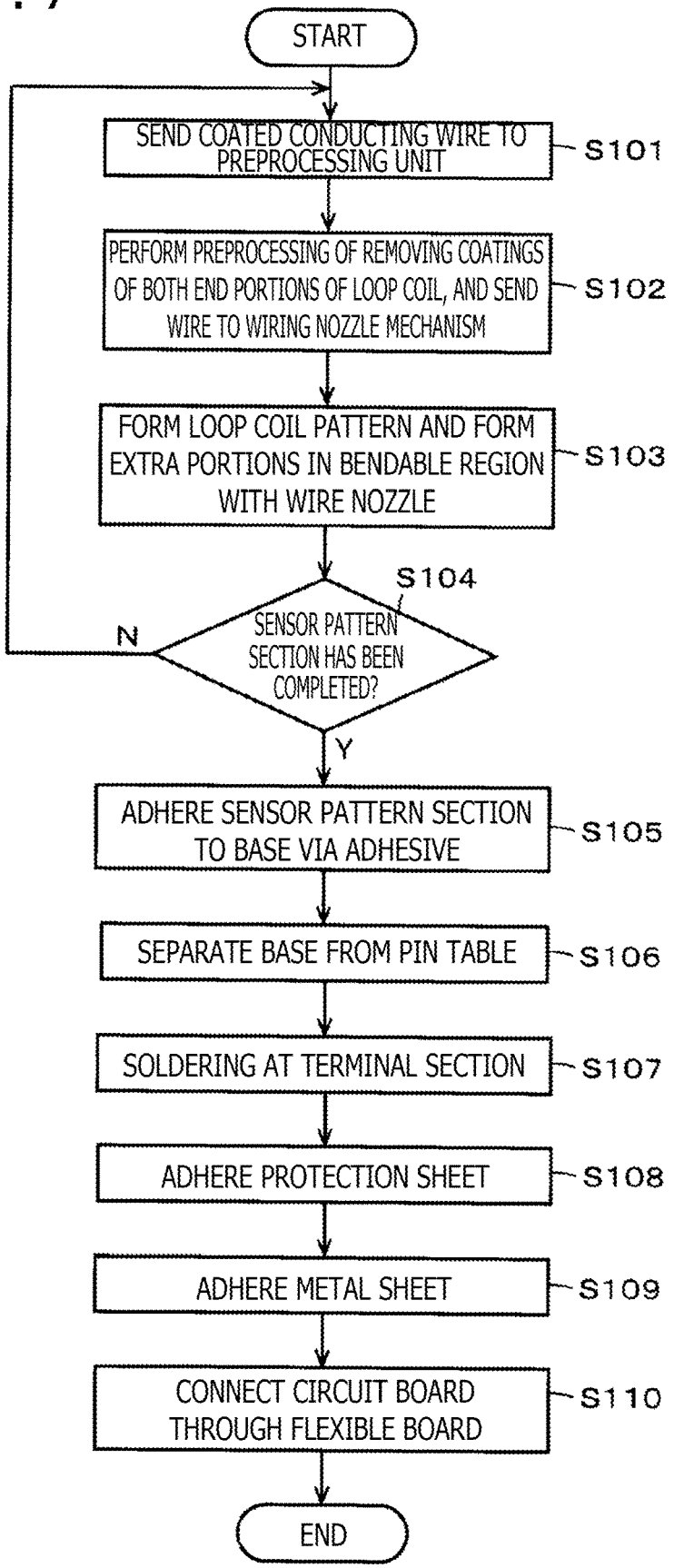
FIG. 7 is a flowchart for explaining a procedure of an example of the method for manufacturing the position detection sensor according to the embodiment of the disclosure.

Next, the flow of the steps of the method for manufacturing the position detection sensor according to this embodiment will now be described below with reference to a flowchart of FIG. 7. Note that a process of each of the steps described below is performed under control of the sequence control section of the apparatus for manufacturing the position detection sensor.

First, the sequence control section issues an instruction to the preprocessing unit 100 to draw (pull) the coated conducting wire 18 out of the wire feeding unit 100 (step S101). The preprocessing unit 110 performs preprocessing of cutting the coated conducting wire 18 drawn out of the wire feeding unit 100 to a length that matches that of the X-axis direction loop coil 13X or the Y-axis direction loop coil 13Y, and removing coatings of the tip portions 18Ea of the both end portions 18E of the X-axis direction loop coil 13X or the Y-axis direction loop coil 13Y to expose the conducting wire. Then, the preprocessing unit 110 sends the coated conducting wire 18 subjected to the preprocessing to the wiring nozzle mechanism 1222 of the wiring unit 120 (step S102).

By use of the movement control section of the two-axis moving wiring instrument 122, the wiring unit 120 controls the wire nozzle 1222a of the wiring nozzle mechanism 1222 to move so as to form the X-axis direction loop coil 13X or the Y-axis direction loop coil 13Y and form the extra room portions, in this example, the extra wound portions 18Eb and 18Ec, in the both end portions 18E of the X-axis direction loop coil 13X or the Y-axis direction loop coil 13Y in the bendable region ARc while guiding the coated conducting wire 18 along the guide pins on the pin table 123 (step S103).

Figure 8:
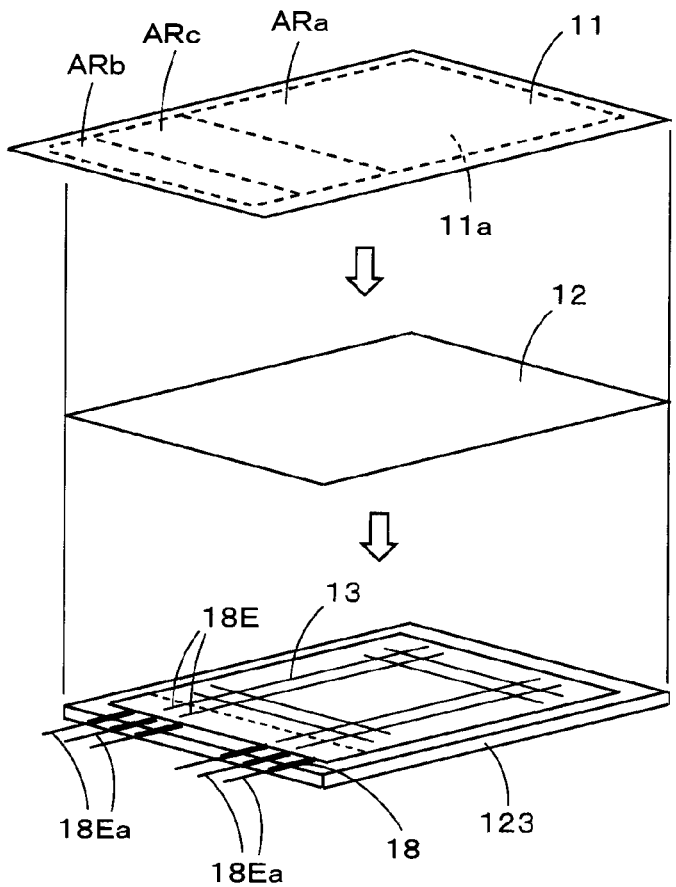
FIG. 8 is a diagram for explaining an example of the method for manufacturing the position detection sensor according to the embodiment of the disclosure.

In this case, as illustrated in FIG. 8, the tip portions 18Ea of the both end portions 18E of the X-axis direction loop coil 13X or the Y-axis direction loop coil 13Y, where the conducting wire is exposed due to the removal of the coatings of the coated conducting wire 18, are arranged to project from the pin table 123 in the lateral direction (i.e., the X-axis direction) of the base 11. In addition, as a result of the coated conducting wire 18 being guided by the guide pins 124, the tip portion 18Ea of the both end portions 18E is positioned so as to be positioned on the corresponding terminal conductor 17 in the terminal section 16 as described above with reference to FIGS. 1A and 1B.

After the formation of the X-axis direction loop coil 13X or the Y-axis direction loop coil 13Y is finished, the sequence control section determines whether formation of all of the plurality of X-axis direction loop coils 13X and the plurality of Y-axis direction loop coils 13Y on the pin table 123 is completed to form the sensor pattern section 13 (step S104).

If it is determined at step S104 that the sensor pattern section 13 has not been formed yet, the sequence control section returns control to step S101, and performs control such that the processes of steps S101 to S103 will be performed with respect to each of the plurality of X-axis direction loop coils 13X and the plurality of Y-axis direction loop coils 13Y.

If it is determined at step S104 that the sensor pattern section 13 has been completed (fully formed), as illustrated in FIG. 8, the base 11 is placed over and pressed against the sensor pattern section 13 on the pin table 123 with the adhesive 12 inserted therebetween, which may be a double-sided tape for example, so that the sensor pattern section 13 on the pin table 123 is adhered to the base 11 via the adhesive 12 (step S105).

In this case, as illustrated in FIG. 8, the surface 11a of the base 11, which faces the pin table 123, has formed thereon and adhered thereto in advance the terminal section 16 on which the terminal conductors 17 (which are not depicted in FIG. 8; see FIGS. 1A and 1B) are formed. In this embodiment, as illustrated in FIGS. 1A and 1B, the base 11 has the region ARb in which the terminal section 16 is formed, the bendable region ARc, and the region ARa of the sensor pattern section 13 (see regions indicated by dashed lines in FIG. 8).

In this embodiment, the double-sided tape that forms the adhesive 12 is arranged to have a size corresponding to the size of the region ARa of the sensor pattern section 13, and in this example, the adhesive 12 is positioned so as not to lie over the bendable region ARc or the region ARb in which the terminal section 16 is formed. Then, the base 11 is positioned such that the sensor pattern section 13 on the pin table 123 is aligned with the region ARa of the sensor pattern section 13, and is pressed against the pin table 123 with the adhesive 12 inserted therebetween.

The positioning of the base 11 and the double-sided tape as the adhesive 12 is performed by use of predetermined ones of the guide pins 124 (for example, guide pins 124 corresponding to four corners of the region ARa) which are projecting above the pin table 123. Note that the adhesive 12 may be adhered to the region ARa of the base 11 in advance.

Meanwhile, as illustrated in FIG. 8, in the sensor pattern section 13 on the pin table 123, the both end portions 18E of each of the plurality of X-axis direction loop coils 13X and the plurality of Y-axis direction loop coils 13Y are led out onto the bendable region ARc, and are arranged to project from the region ARa of the sensor pattern section 13 across the bendable region ARc toward the terminal section 16 such that the tip portion 18Ea of the both end portions 18E, where the conducting wire is exposed, can be connected to the corresponding terminal conductor 17 in the terminal section 16.

Figure 9:
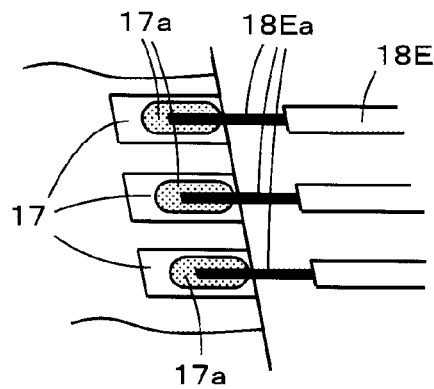
FIG. 9 is a diagram for explaining an example of the method for manufacturing the position detection sensor according to the embodiment of the disclosure.

When the first surface 11a of the base 11 is positioned and pressed against the pin table 123 as described above, the guide pins 124 pierces into and through the base 11, and the sensor pattern section 13 is adhered to the region ARa of the base 11 via the adhesive 12. In addition, as illustrated in FIG. 9, the tip portion 18Ea of the both end portions 18E of each of the plurality of X-axis direction loop coils 13X and the plurality of Y-axis direction loop coils 13Y, where the conducting wire is exposed due to the removal of the coating of the coated conducting wire 18, is positioned on the corresponding terminal conductor 17 in the terminal section 16.

Once the sensor pattern section 13 is thus adhered to the first surface 11a of the base 11 via the adhesive 12, the base 11 is separated from the pin table 123 (step S106). In this case, by use of a lifting mechanism that involves use of a robot hand (not depicted) or the like, the base 11 is lifted off the guide pin mounting plate 1231 together with the intermediate plate 1232 and the release sheet 1233, and is thus removed from the guide pins 124. Note that, instead of the base 11 being lifted together with the intermediate plate 1232 and the release sheet 1233, the guide pin mounting plate 1231 may be lowered by a distance equal to or greater than the height of the guide pins, with the base 11 being held by a robot hand (not depicted) or the like together with the intermediate plate 1232 and the release sheet 1233, to remove the base 11 from the guide pins 124.

After being removed from the guide pins 124, the base 11 having the release sheet 1233 attached thereto is turned upside down, and is mounted on a table (not depicted) different from the pin table 123. Then, the release sheet 1233 is removed from the sensor pattern section 13 adhered to the first surface 11a of the base 11.

The first surface 11a of the base 11, which has been removed from the pin table 123 as described above, has the sensor pattern section 13 adhered thereto, and as described above, the tip portion 18Ea of the both end portions 18E of each of the plurality of X-axis direction loop coils 13X and the plurality of Y-axis direction loop coils 13Y, where the conducting wire is exposed due to the removal of the coating of the coated conducting wire 18, is positioned on the corresponding terminal conductor 17 in the terminal section 16.

As illustrated in FIG. 9, in this embodiment, a solder 17a is applied in advance onto each of the terminal conductors 17 in the terminal section 16 on the first surface 11a of the base 11. Then, in this embodiment, the solder 17a on each of the terminal conductors 17 in the terminal section 16 is heated and melted to solder and electrically connect the corresponding tip portion 18Ea of the both end portions 18E, where the conducting wire is exposed due to the removal of the coating of the coated conducting wire 18, to the terminal conductor 17 in the terminal section 16 (step S107).

Next, in this embodiment, the protection sheet 14 (see FIGS. 1A and 1B) is adhered onto the sensor pattern section 13 in the region ARa of the first surface 11a of the base 11 via an adhesive so as to cover the sensor pattern section 13 (step S108). Next, in this embodiment, the metal sheet 19, which forms the electromagnetic shielding layer, is adhered to the surface of the base 11 on the side opposite to the first surface 11a (step S109).

Then, in this embodiment, the flexible board 21 is attached to the terminal section 16 to connect each of the terminal conductors 17 in the terminal section 16 to the connector terminal section of the circuit board 22 (step S110).

The position detection sensor 1 according to this embodiment can be manufactured in the above-described manner. Then, when the position detection sensor 1 according to this embodiment is disposed on a rear side of a display screen of an input device so as to overlap or coincide with the display screen, for example, the position detection sensor 1 is bent in the bendable region ARc as described above.

Note that an adhesive separate from the adhesive 12 may be used for the adhesion of the protection sheet 14. Also, portions of the adhesive 12 lying on the sensor pattern section 13 (more specifically, portions of the adhesive 12 which lie in portions of the region of the sensor pattern section 13 where the coated conducting wires forming the loop coil patterns do not exist) may be used to adhere the protection sheet 14 to the first surface 11a of the base 11.

As described above, the method for manufacturing the position detection sensor according to this embodiment is capable of manufacturing the position detection sensor 1 such that the sensor pattern section 13 is easily disposed on the first surface 11a of the base 11 by use of the coated conducting wires, and electrical connection between the terminal conductors 17 in the terminal section 16 and the corresponding loop coils in the sensor pattern section 13 is easily achieved. Moreover, use of the manufacturing method according to this embodiment makes it possible to mass-produce the position detection sensors 1.

Other Examples of Extra Room Portions in Bendable Region ARc

In the position detection sensor 1 according to the above-described embodiment, the extra room portions formed by the non-straight portions of the coated conducting wires in the bendable region ARc are the extra wound portions 18Eb and 18Ec formed in the both end portions 18E of each of the X-axis direction loop coils 13X and the Y-axis direction loop coils 13Y. Note, however, that the extra room portions formed by the non-straight portions in the bendable region ARc are not limited to this example.

Figure 11:
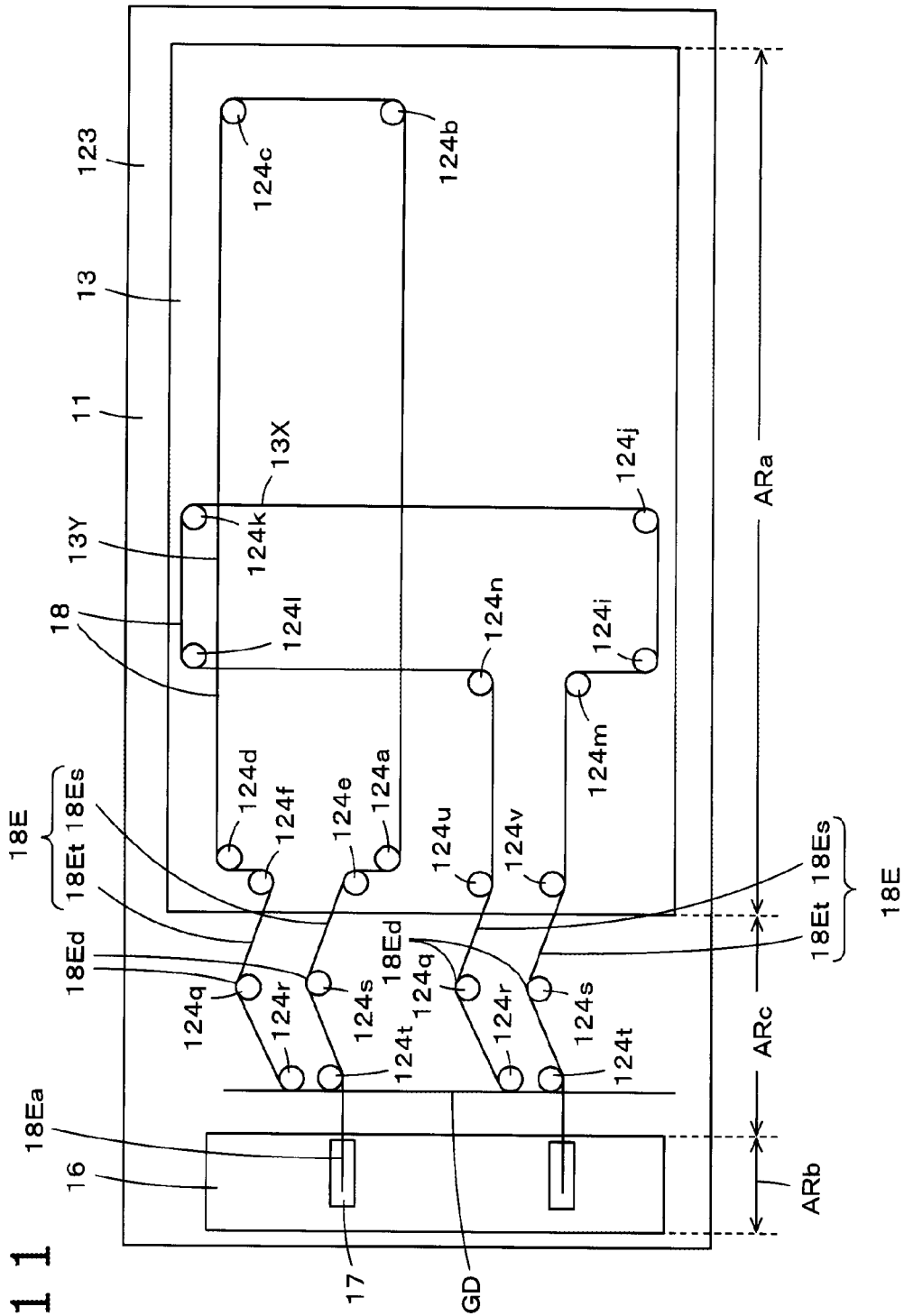
FIG. 11 is a diagram for explaining a method for manufacturing the position detection sensor according to the other embodiment of the disclosure.

FIGS. 10A, 10B, and 11 are diagrams for explaining a position detection sensor 1A according to an embodiment of this disclosure, which is different from the position detection sensor 1 according to the above-described embodiment in the configuration of the extra room portions formed by the non-straight portions in the bendable region ARc. In this embodiment, the extra room portions are bent portions formed in the both end portions 18E of each of the X-axis direction loop coils 13X and the Y-axis direction loop coils 13Y.

FIGS. 10A and 10B are diagrams corresponding to FIGS. 1A and 1B, which illustrate the position detection sensor 1 according to the above-described embodiment. FIG. 10A is a diagram illustrating a surface of the position detection sensor 1A on which the sensor pattern section 13 is formed as viewed in a direction perpendicular to that surface. FIG. 10B is a schematic diagram illustrating the configuration of a cross-section of the position detection sensor 1A. FIG. 11 is a diagram corresponding to FIG. 6, which illustrates the position detection sensor 1 according to the above-described embodiment, and FIG. 11 illustrates formation of patterns of one of the Y-axis direction loop coils 13Y and one of the X-axis direction loop coils 13X, and formation of the extra room portions in the bendable region ARc.

Portions of the position detection sensor 1A according to this embodiment which have their equivalents in the position detection sensor 1 according to the above-described embodiment are denoted by the same reference signs as those of their equivalents in the position detection sensor 1, and detailed descriptions thereof will be omitted.

As illustrated in FIGS. 10A, 10B, and 11, the position detection sensor 1A according to this embodiment is similar to the position detection sensor 1 according to the above-described embodiment in the configurations of the portions that form the rectangular loop coil patterns of the Y-axis direction loop coils 13Y and the X-axis direction loop coils 13X and the configuration of the terminal section 16.

Regarding the position detection sensor 1A according to this embodiment, two guide pins 124q and 124r and two guide pins 124s and 124t are disposed in the bendable region ARc for forming bent portions 18Ed in the first end portion 18Es and the second end portion 18Et of the both end portions 18E of each of the Y-axis direction loop coils 13Y and the X-axis direction loop coils 13X.

Then, as illustrated in FIG. 11, the first end portion 18Es and the second end portion 18Et of the both end portions 18E of each of the Y-axis direction loop coils 13Y and the X-axis direction loop coils 13X are led along the guide pins 124q, 124r, 124s, and 124t to form the bent portions 18Ed, each formed of a bent line, in the bendable region ARc.

Note that, in a case of this embodiment, as illustrated in FIG. 11, guide pins 124u and 124v are disposed at positions at which the both end portions 18E of the X-axis direction loop coil 13X are led out from the sensor pattern section 13 into the bendable region ARc. The position detection sensor 1A is otherwise similar in configuration to the position detection sensor 1 according to the above-described embodiment.

When pulled out off the pin table 123, the bent portions 18Ed formed in the both end portions 18E of each of the Y-axis direction loop coils 13Y and the X-axis direction loop coils 13X in the bendable region ARc as described above cause slack in the bendable region ARc, and serve as extra room portions that are extensible in the lateral direction of the base 11. Accordingly, when the base 11 is bent in the bendable region ARc as described above, the bent portions 18Ed serve as extra extensible portions of the coated conducting wire 18 to prevent the abovementioned problems that could be caused by a bending stress.

Note that the extra room portions formed by non-straight portions of the coated conducting wire in the bendable region ARc are not limited to the extra wound portions or the bent portions in the embodiments as described above, but may be portions in any desirable configuration as long as the portions serve as extra room portions that are extensible in a direction in which a stress is applied when the base 11 is bent, e.g., the lateral direction of the base 11 in this embodiment.

<Method for Manufacturing Position Detection Sensor According to Another Embodiment>

In the method for manufacturing the position detection sensor according to the above-described embodiment, the pin table 123 having the guide pins 124 mounted thereon is used. Note, however, that each of the position detection sensor 1 and the position detection sensor 1A can also be formed without use of the pin table 123.

In a method for manufacturing the position detection sensor according to another embodiment of this disclosure, a layer of the adhesive 12 is provided on the first surface 11a of the base 11, and the terminal section 16 and the sensor pattern section 13 are disposed on the layer of the adhesive 12 by use of a wiring nozzle mechanism. A wiring nozzle mechanism of a wiring unit used in this case does not form each of the loop coil patterns by leading a coated conducting wire along guide pins, but forms each of the loop coil patterns by moving a wire nozzle while pressing the coated conducting wire 18 against the adhesive 12 on the first surface 11a of the base 11. A configuration to achieve such adhesion method is well known, and therefore a description thereof is omitted. Also in the bendable region ARc, the extra room portions formed of non-straight portions may be formed while pressing the coated conducting wire 18. The method according to this embodiment is otherwise similar to the method for manufacturing the position detection sensor according to the above-described embodiment.

In the method for manufacturing the position detection sensor according to the other embodiment described above, the coated conducting wire is adhered to the layer of the adhesive after the layer of the adhesive is applied onto the base 11. Note, however, that a coated conducting wire having an adhesive attached thereto that can be melted through heat, for example, may be used instead of applying the adhesive layer onto the base, and the coated conducting wire may be adhered onto the base while the adhesive of the coated conducting wire is melted through heat. Note, however, that the both end portions 18E in the bendable region ARc are not adhered to the first surface 11a of the base 11.

Other Embodiments or Modifications

In the position detection sensor 1 according to the above-described embodiment, the terminal section 16 includes the board which is in the shape of a sheet or a film and which is made of an insulating material, e.g., PET, and which includes the terminal conductors 17, e.g., copper foil patterns, to be electrically connected to the corresponding electrode conductors of the sensor pattern section 13 formed on the board through printing or the like, wherein the terminal section 16 is adhered onto the base 11 via the adhesive. Note, however, that the above configuration of the terminal section 16 and the above method of forming the terminal section 16 on the base 11 are mere examples, and should not be construed as limiting the disclosure. For example, the terminal conductors 17 formed by copper foil patterns, for example, may be directly formed on the first surface 11a of the base 11 through printing or the like to form the terminal section.

In addition, in the above-described embodiment, only the terminal conductors 17 are formed in the terminal section 16, and the circuit board 22 is connected to the terminal section 16 via the flexible board 21. Note, however, that the circuit elements of the position detection circuit 200 illustrated in FIG. 3 may be provided in the terminal section 16, or the position detection circuit 200 as an integrated circuit may be provided in the terminal section 16. In a case where the circuit elements of the position detection circuit 200 are provided in the terminal section 16, or the position detection circuit 200 as an integrated circuit is provided in the terminal section 16, it may be sufficient if a connection terminal for input and output to and from the process control section 207 and a connection terminal for power supply are provided as terminals used for connection between the terminal section 16 of the position detection sensor 1 or 1A and external devices.

In addition, in the above-described embodiment, the protection sheet 14 is adhered so as to cover only the sensor pattern section 13. Note, however, that the protection sheet 14 may alternatively be adhered so as to cover not only the sensor pattern section 13 but also the terminal section 16. In this case, however, conductors in the terminal section 16 which are used for connection between the position detection sensor 1 and external devices are not covered with the protection sheet 14.

In the manufacturing method according to the above-described embodiment, the soldering of the both end portions of each of the plurality of X-axis direction loop coils 13X and the plurality of Y-axis direction loop coils 13Y to the terminal conductors 17 in the terminal section 16 is performed before the protection sheet 14 is adhered so as to cover the sensor pattern section 13. Note, however, that the soldering at the terminal section 16 may alternatively be performed after the sensor pattern section 13 is covered with the protection sheet 14.

Further, in the above-described embodiment, the both end portions of each of the plurality of X-axis direction loop coils 13X and the plurality of Y-axis direction loop coils 13Y are electrically connected to the corresponding terminal conductors 17 in the terminal section 16 through soldering. However, in a case where the terminal conductors 17 in the terminal section 16 are covered with the protection sheet via an adhesive, the tip portion 18Ea of the both end portions 18E of each of the plurality of X-axis direction loop coils 13X and the plurality of Y-axis direction loop coils 13Y is held down by the protection sheet while being in contact with the corresponding terminal conductor 17, and therefore, the soldering process may be omitted.

Furthermore, in the above-described embodiment, the position detection sensor has a rectangular external shape, but the external shape of a position detection sensor according to the other embodiment of this disclosure need not be rectangular but may be any desirable shape. Furthermore, the base may be either planar or in the shape of a curved surface. Furthermore, needless to say, the shape of the patterns of the loop coils is not limited to the rectangular shape as in the above-described embodiment.

Furthermore, the plurality of loop coils are not necessarily arranged in both the X-axis direction and the Y-axis direction as in the above-described embodiment, but may alternatively be arranged only in one direction.

Furthermore, in the above-described method for manufacturing the position detection sensor, before the sensor pattern section is formed by the coated conducting wires by use of the wiring unit 120, in the preprocessing unit 110, the coatings of portions of the coated conducting wire which form end portions of the electrode conductor are removed to expose the conducting wire therein according to the pattern of the electrode conductor.

However, it may be sufficient if the end portions of the patterns of the electrode conductors are properly positioned with respect to the corresponding terminal conductors in the terminal section 16, and therefore, it is not essential, in the preprocessing unit 110, to remove the coatings of the portions of the coated conducting wire which form the end portions of the pattern of the electrode conductor before the process of forming the sensor pattern section is performed. For example, a process of removing the coatings of the portions of the coated conducting wire which correspond to the both end portions 18E of each of the patterns of the plurality of electrode conductors of the sensor pattern section 13 may be performed after the sensor pattern section 13 is formed. Alternatively, the portions of the coated conducting wire 18 which correspond to the both end portions 18E of the pattern of the electrode conductor may be positioned with respect to the corresponding terminal conductors 17 in the terminal section 16, and be heated to thereby melt and remove coatings of the coated conducting wire 18 to expose the conducting wire, and the exposed conducting wire may be electrically connected to the terminal conductors 17 through solders applied onto the terminal conductors 17.

In the method for manufacturing the position detection sensor according to the above-described embodiment, the wiring nozzle mechanism of the wiring unit is caused to move on a two-dimensional plane to form the coated conducting wire in the predetermined pattern of the electrode conductor. Note, however, that a plurality of coated conducting wires formed in the predetermined patterns of the electrode conductors (including the extra room portions in the bendable region ARc) may be prepared in advance, and the electrode conductors formed in the predetermined patterns may be adhered onto the base 11 via the adhesive.

In this case, the electrode conductors formed in the predetermined patterns may be adhered onto the base 11 one by one, or alternatively, a plurality of electrode conductors formed in the predetermined patterns and adhered to each other in advance (which may be either all or some of the electrode conductors of the sensor pattern section) may be adhered onto the base 11. In addition, an adhesive may be applied onto the base 11 in advance, or alternatively, an adhesive (which may be a thermoplastic adhesive, and may be an adhesive applied to the coated conducting wire) attached to the coating of the coated conducting wire may be used.

The position detection sensor according to the above-described embodiment is designed for position detection that employs the electromagnetic induction method, and includes the electrode conductors formed as the loop coil patterns. Note, however, that embodiments of the present disclosure are applicable not only to position detection sensors that employ the electromagnetic induction method but also to position detection sensors that employ a capacitive coupling method or any other desirable method.

It is to be noted that the embodiments of the present disclosure are not limited to the foregoing, and that various changes can be made without departing from the principles disclosed herein.

The invention claimed is:

1. A position detection sensor, comprising:
a base made of a flexible material, and having a first surface;
a terminal section having a plurality of terminal conductors disposed therein, and formed on the first surface of the base; and
a sensor pattern section including a plurality of electrode conductors formed of coated conducting wires, arranged in predetermined patterns, and disposed on and adhered to the base via an adhesive in an area that does not overlap with the terminal section on the first surface of the base, wherein end portions of the coated conducting wires of the plurality of electrode conductors are positioned so as to be connectable to corresponding ones of the terminal conductors in the terminal section, wherein the first surface of the base includes a region of the terminal section, a region of the sensor pattern section, and a bendable region between these two regions wherein the bendable region spans a first distance between these two regions,
the end portions of the plurality of electrode conductors of the sensor pattern section are electrically connected to the plurality of terminal conductors in the terminal section through the bendable region,
each of the plurality of electrode conductors includes a first portion having a length of the first distance and an extra room portion having an additional length, such that the plurality of electrode conductors are extensible in the bendable region between the terminal section and the sensor pattern section, wherein no adhesive is applied to the bendable region, and
the extra room portion includes a wound portion in the bendable region to be extensible in the bendable region.

2. The position detection sensor according to claim 1, wherein the extra room portion includes a non-straight portion in the bendable region to be extensible in the bendable region.

3. The position detection sensor according to claim 1, wherein the extra room portion includes a bent portion in the bendable region to be extensible in the bendable region.

4. The position detection sensor according to claim 1, wherein the plurality of electrode conductors of the sensor pattern section include a first loop coil group including a plurality of loop coils arranged at predetermined intervals in a first direction on the first surface of the base, and a second loop coil group including a plurality of loop coils arranged at predetermined intervals in a second direction perpendicular to the first direction on the first surface of the base, each of the loop coils having a predetermined number of turns of the coated conducting wire.

5. The position detection sensor according to claim 4, wherein one end of each of the loop coils of the first loop coil group and the second loop coil group of the sensor pattern section is connected to a ground wire in the bendable region.

6. The position detection sensor according to claim 1, wherein the terminal section is formed on a portion of the base to which a flexible connector board is attached, the flexible connector board having formed thereon a plurality of conductor patterns connected to the terminal conductors in the terminal section.

7. The position detection sensor according to claim 6, wherein a circuit board is connected to an end portion of the flexible connector board on a side opposite from a side on which the terminal section lies on the base, wherein the circuit board is provided with another terminal section to which the plurality of conductor patterns are connected.

8. The position detection sensor according to claim 7, wherein the base is bent in the bendable region to a side opposite to a side on which the first surface lies, so that the flexible connector board and the circuit board are positioned on the opposite side of the base with respect to the first surface.

9. The position detection sensor according to claim 1, wherein the plurality of electrode conductors are not adhered to the base in the bendable region.

10. The position detection sensor according to claim 1, further comprising:
a metal sheet disposed on a surface of the base on a side opposite to the first surface.

11. The position detection sensor according to claim 1, wherein the base is formed of a flexible board.

12. The position detection sensor according to claim 1, wherein the base is bent in the bendable region to a side opposite to a side on which the first surface lies, so that the terminal section is positioned on the opposite side of the base with respect to the first surface.

13. The position detection sensor according to claim 1, further comprising:
a protection sheet disposed on the sensor pattern section disposed on the base via the adhesive, the protection sheet attached to the base via the adhesive with the sensor pattern section intervening between the protection sheet and the base.

14. A method for manufacturing a position detection sensor using a base made of a flexible material and including a first surface, wherein the base includes a region of a terminal section having a plurality of terminal conductors formed therein, a region in which a sensor pattern section is formed, and a bendable region between the region of the terminal section and the region of the sensor pattern section wherein the bendable region spans a first distance between these two regions, the method comprising:
a first step of disposing and adhering a plurality of electrode conductors formed of coated conducting wires onto the base via an adhesive in the region of the sensor pattern section such that the electrode conductors are arranged in predetermined patterns, such that end portions of the electrode conductors are positioned so as to be connectable to corresponding ones of the terminal conductors in the terminal section;
a second step of electrically connecting the end portions of the electrode conductors of the sensor pattern section to the corresponding terminal conductors in the terminal section formed on the base in the region of the terminal section; and
a third step of, before or after the first step, and before the second step, performing a process of making each of the plurality of electrode conductors to include a first portion having a length of the first distance and an extra room portion having an additional length, such that the plurality of electrode conductors are extensible in the bendable region between the terminal section and the sensor pattern section, wherein no adhesive is applied to the bendable region and the extra room portion includes a wound portion in the bendable region to be extensible in the bendable region.

15. The method for manufacturing the position detection sensor according to claim 14, further comprising:
a fourth step of, before the first step and the third step, removing coatings of end portions of the coated conducting wires of the plurality of electrode conductors to expose portions of the conducting wires, wherein
in the second step, the exposed portions of the conducting wires of the plurality of electrode conductors of the sensor pattern section are electrically connected to the corresponding terminal conductors in the terminal section.

16. The method for manufacturing the position detection sensor according to claim 14, wherein
in the first step, on a pin mounting plate having guide pins disposed thereon, the plurality of electrode conductors formed of the coated conducting wires are disposed by use of the guide pins such that the electrode conductors are arranged in the predetermined patterns, and the end portions of the electrode conductors are positioned by use of the guide pins so as to be connectable to the corresponding terminal conductors in the terminal section,
in the third step, when each of the electrode conductors is led between the terminal section and the sensor pattern section, the electrode conductor is wound around a guide pin on the pin mounting plate disposed in the bendable region so as to form the extra room portion, and
in the second step, after the sensor pattern section is adhered to the base, the base having the sensor pattern section adhered thereto is separated from the pin mounting plate.

17. The method for manufacturing the position detection sensor according to claim 14, wherein
in the first step, on a pin mounting plate having guide pins disposed thereon, the plurality of electrode conductors formed of the coated conducting wires are disposed by use of the guide pins such that the electrode conductors are arranged in the predetermined patterns, and the end portions of the electrode conductors are positioned by use of the guide pins so as to be connectable to the corresponding terminal conductors in the terminal section,
in the third step, when each of the electrode conductors is led between the terminal section and the sensor pattern section, the electrode conductor is bent by a guide pin on the pin mounting plate disposed in the bendable region so as to form the extra room portion, and
in the second step, after the sensor pattern section is adhered to the base, the base having the sensor pattern section adhered thereto is separated from the pin mounting plate.

18. The method for manufacturing the position detection sensor according to claim 14, wherein the plurality of electrode conductors of the sensor pattern section include a first loop coil group including a plurality of loop coils arranged at predetermined intervals in a first direction on the first surface of the base, and a second loop coil group including a plurality of loop coils arranged at predetermined intervals in a second direction perpendicular to the first direction on the first surface of the base, each of the loop coils having a predetermined number of turns of the coated conducting wire.

* * * * *